United States Patent
Meir et al.

(10) Patent No.: US 9,021,215 B2
(45) Date of Patent: Apr. 28, 2015

(54) STORAGE SYSTEM EXPORTING INTERNAL STORAGE RULES

(75) Inventors: Avraham Meir, Rishon le-Zion (IL); Micha Anholt, Tel-Aviv (IL); Ariel Maislos, Bnei Tzion (IL); Camuel Gilyadov, Modi'in (IL); Doron Fischer, Hod Hasharon (IL)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 13/419,453

(22) Filed: Mar. 14, 2012

(65) Prior Publication Data

US 2012/0246435 A1 Sep. 27, 2012

Related U.S. Application Data

(60) Provisional application No. 61/454,599, filed on Mar. 21, 2012.

(51) Int. Cl.
*G06F 12/00* (2006.01)
*G06F 13/00* (2006.01)

(52) U.S. Cl.
CPC ...................... *G06F 13/00* (2013.01)

(58) Field of Classification Search
CPC ............ G06F 12/0246; G06F 13/4068; G06F 2212/2022; G06F 12/0646; G06F 13/1694; G06F 2212/222; G06F 3/0607; G06F 3/0661; G06F 2212/1032; G06F 2212/7201; G06F 2212/7207; G06F 3/0679; G06F 1/3215; G06F 1/325; G06F 12/0835; G06F 12/023; G06F 12/0238; G06F 13/00; G06F 13/1668; G06F 13/4027; G06F 3/06; G06F 3/0631; G06F 3/0634; G06F 3/0653; G06F 3/0629; G06F 3/0626; G06F 3/0688
USPC .................................................. 711/154, 103
See application file for complete search history.

(56) References Cited

U.S. PATENT DOCUMENTS

| | | | |
|---|---|---|---|
| 7,376,034 B2 | 5/2008 | Torabi et al. | |
| 7,958,280 B2 | 6/2011 | Salessi et al. | |
| 2001/0018721 A1* | 8/2001 | McKenna et al. | 710/126 |
| 2005/0141312 A1 | 6/2005 | Sinclair et al. | |
| 2006/0047897 A1* | 3/2006 | Thiessen et al. | 711/112 |
| 2006/0265550 A1* | 11/2006 | Sakaguchi et al. | 711/122 |
| 2007/0180186 A1* | 8/2007 | Cornwell et al. | 711/103 |
| 2008/0189490 A1 | 8/2008 | Cheon et al. | |
| 2009/0204872 A1* | 8/2009 | Yu et al. | 714/773 |
| 2009/0271562 A1 | 10/2009 | Sinclair | |
| 2009/0287876 A1* | 11/2009 | Yeh | 711/103 |
| 2010/0250836 A1* | 9/2010 | Sokolov et al. | 711/103 |
| 2010/0262721 A1* | 10/2010 | Asnaashari et al. | 710/5 |
| 2010/0332757 A1* | 12/2010 | Nychka et al. | 711/125 |

* cited by examiner

*Primary Examiner* — Hashem Farrokh
(74) *Attorney, Agent, or Firm* — Meyertons, Hood, Kivlin, Kowert & Goetzel, P.C.

(57) ABSTRACT

A data storage method includes, in a memory controller that accepts memory access commands from a host for execution in one or more memory units, holding a definition of a policy to be applied by the memory controller in the execution of the memory access commands in the memory units. The policy is reported from the memory controller to the host so as to cause the host to format memory access commands based on the reported policy.

35 Claims, 1 Drawing Sheet

STORAGE SYSTEM EXPORTING INTERNAL STORAGE RULES

CROSS-REFERENCE TO RELATED APPLICATIONS

This application claims the benefit of U.S. Provisional Patent Application 61/454,599, filed Mar. 21, 2011, whose disclosure is incorporated herein by reference.

FIELD OF THE INVENTION

The present invention relates generally to data storage, and particularly to methods and systems for parallel data storage in multiple storage devices.

BACKGROUND OF THE INVENTION

Some storage systems, such as Solid State Drives (SSDs), store data on behalf of a host in multiple Non-Volatile Memory (NVM) devices. Various storage protocols have been developed for connecting storage systems to hosts. Examples of storage protocols include Serial Advanced Technology Attachment (SATA), Serial Attached SCSI (SAS) and NVM express.

SUMMARY OF THE INVENTION

An embodiment of the present invention that is described herein provides a data storage method in a memory controller that accepts memory access commands from a host for execution in one or more memory units. The method includes holding a definition of a policy to be applied by the memory controller in the execution of the memory access commands in the memory units. The policy is reported from the memory controller to the host so as to cause the host to format memory access commands based on the reported policy.

In a disclosed embodiment, reporting the policy includes reporting one or more parallelism rules that specify distribution of the memory access commands among the memory units. In another embodiment, reporting the policy includes reporting one or more parallelism rules that specify ranges of logical addresses that are accessed in parallel by the memory controller. In yet another embodiment, reporting the policy includes reporting one or more pipeline rules that specify properties of an execution pipeline in the memory controller, which executes the memory access commands in the memory units.

In still another embodiment, reporting the policy includes reporting one or more prioritization rules that specify priorities according to which the memory controller executes the memory access commands in the memory units. In an embodiment, reporting the policy includes reporting one or more redundancy rules that specify a redundant storage scheme applied by the memory controller in the memory units. In another embodiment, reporting the policy includes reporting one or more power consumption rules that specify power consumption characteristics of the memory units. In yet another embodiment, reporting the policy includes reporting one or more performance rules that specify performance characteristics of individual ones of the memory units.

In some embodiments, reporting the policy includes reporting a mapping, defined in the memory controller, between logical addresses associated with the memory access commands and respective physical storage locations in the memory units. In an embodiment reporting the policy includes reporting to the host that a given rule in the policy is configurable.

In some embodiments, the method includes formatting the memory access commands in the host in accordance with a criterion that optimizes a performance measure of the execution responsively to the reported policy, sending the formatted memory access commands from the host to the memory controller, and receiving the memory access commands in the memory controller and executing the received memory access commands in the memory units.

In various embodiments, the criterion maximizes a throughput of the execution, minimizes a latency of the execution, and/or minimizes a power consumption of the execution. In some embodiments, reporting the policy includes reporting a mapping, defined in the memory controller, between logical addresses associated with the memory access commands and respective physical storage locations in the memory units, and formatting the memory access commands includes assigning the logical addresses to the memory access commands responsively to the reported policy.

In a disclosed embodiment, formatting the memory access commands includes setting an order of the memory access commands responsively to the reported policy.

In another embodiment, reporting the policy includes reporting to the host that a given rule in the policy is configurable, and formatting the memory access commands includes modifying the given rule in the memory controller by the host.

there is additionally provided, in accordance with an embodiment of the present invention, a data storage method. The method includes holding in a memory controller a definition of a policy to be applied by the memory controller in accessing one or more memory units. The policy is reported from the memory controller to a host that is coupled to the memory controller. In response to reporting the policy, memory access commands are received in the memory controller. The memory access commands have been formatted by the host in accordance with a criterion that optimizes a performance measure of the execution responsively to the reported policy. The received memory access commands are executed in the memory units.

There is also provided, in accordance with an embodiment of the present invention, a data storage method including receiving from a memory controller a communication to a host reporting a definition of a policy to be applied by the memory controller in accessing one or more memory units. Memory access commands are formatted in the host in accordance with a criterion that optimizes a performance measure of the execution responsively to the reported policy. The formatted memory access commands are sent from the host to the memory controller for execution.

There is further provided, in accordance with an embodiment of the present invention, a memory controller including a memory and a processor. The memory is configured to hold a definition of a policy to be applied by the memory controller in accessing one or more memory units. The processor is configured to report the policy to a host that is coupled to the memory controller, and, in response to reporting the policy, to receive memory access commands that have been formatted by the host in accordance with a criterion that optimizes a performance measure of the execution responsively to the reported policy, and to execute the received memory access commands in the memory units.

There is additionally provided, in accordance with an embodiment of the present invention a system including a memory controller and a host. The memory controller is configured to accept memory access commands for execution in one or more memory units, to hold a definition of a policy to be applied in the execution of the memory access commands in the memory units, and to report the policy over an interface. The host is configured to accept the reported policy from the memory controller over the interface, to format the memory access commands in accordance with a criterion that optimizes a performance measure of the execution responsively to the reported policy, and to send the formatted memory access commands to the memory controller for the execution in the memory units.

There is also provided, in accordance with an embodiment of the present invention, a host including an interface and a processor. The interface is configured to receive from a memory controller a communication reporting a definition of a policy to be applied by the memory controller in accessing one or more memory units. The processor is configured to format memory access commands in accordance with a criterion that optimizes a performance measure of the execution responsively to the reported policy, and to send the formatted memory access commands over the interface to the memory controller for execution.

The present invention will be more fully understood from the following detailed description of the embodiments thereof, taken together with the drawings in which:

DETAILED DESCRIPTION OF EMBODIMENTS

Overview

Figure 1:
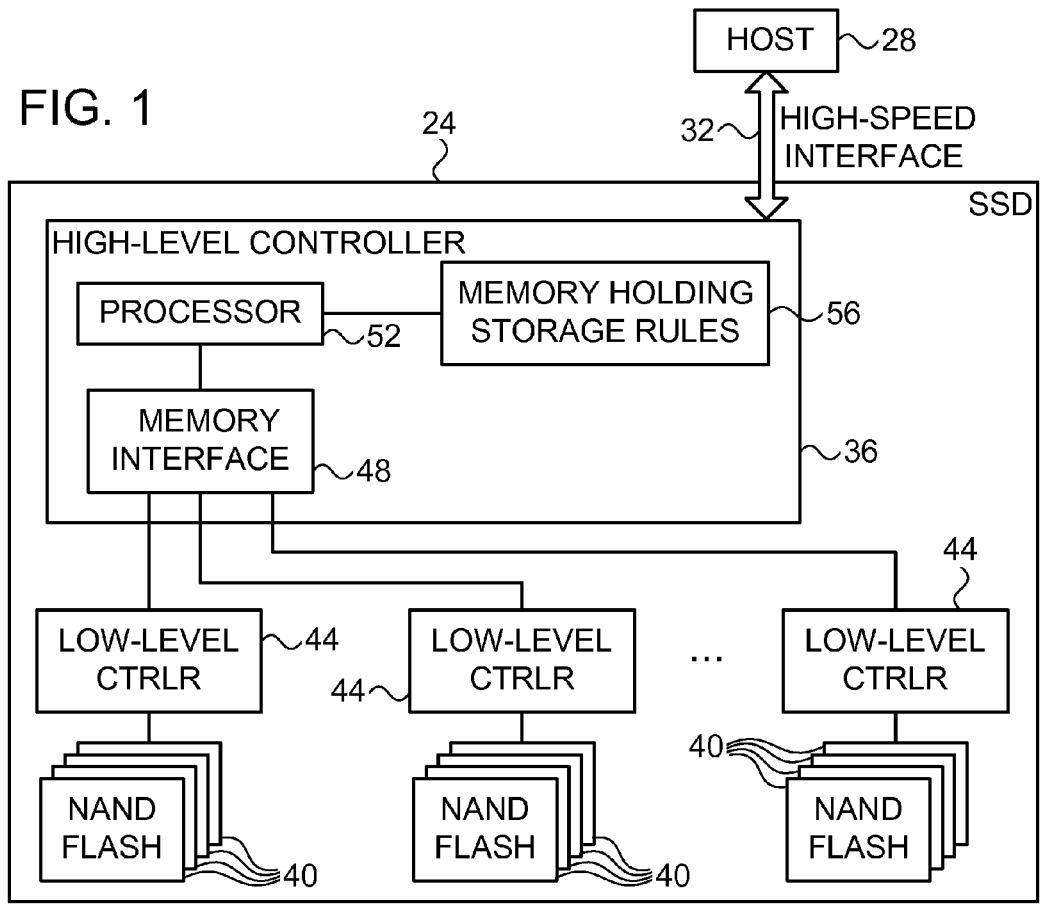
FIG. 1 is a block diagram that schematically illustrates a Solid State Disk (SSD), in accordance with an embodiment of the present invention.

In some storage applications, a memory system such as a Solid State Disk (SSD) stores data in multiple non-volatile memory units on behalf of a host. The memory system comprises a memory controller, which receives from the host memory access commands (e.g., read and write commands) and executes the commands in the memory units. Embodiments of the present invention that are described hereinbelow provide improved data storage techniques that can be used in memory systems of this sort.

The memory controller typically executes the memory access commands received from the host in accordance with a certain policy. The policy may specify, for example, parallelism rules that define how the memory controller distributes the memory access commands among the memory units, pipeline rules that define how a pipeline in the memory controller executes the commands, and/or prioritization rules that define how the memory controller prioritizes execution of the commands.

In the disclosed embodiments, the memory controller reports the policy to the host, and the host formats the memory access commands based on the reported policy. The host typically formats the commands in accordance with a criterion that aims to optimize a performance measure of the data storage process, such as throughput or latency.

For example, a parallelism rule in the policy may define how the memory controller maps logical addresses to memory units. Being aware of this rule, the host may assign logical addresses to the write commands in a way that avoids congestion of write commands in any given memory unit. Address assignment of this sort reduces latency and increases throughput.

As another example, a pipeline rule may define the depth of the memory controller pipeline. Being aware of this rule, the host may decide to limit the number of pending memory access commands so as not to exceed the pipeline depth. As yet another example, a prioritization rule in the policy may define execution priorities among different types of memory access commands, e.g., priorities between read commands and write commands or priorities between short commands and long commands. Being aware of this rule, the host may send the memory access commands to the memory controller in an order that increases the efficiency with which the memory controller processes the commands. In this example too, latency is reduced and throughput is increased.

In other embodiments, the memory controller policy involves storing the data while applying a redundant storage scheme such as Redundant Array of Inexpensive Disks (RAID) among the memory units. In these embodiments, the memory controller may report parameters of the redundant storage scheme to the host, and the host may take these parameters into account when formatting the memory access commands.

In other disclosed embodiments, the memory controller reports to the host power consumption parameters of the memory units or the memory system as a whole, and/or other performance characteristics of individual memory units such as speed or available redundancy. The host may take this information into account when formatting memory access commands. These techniques may be helpful, for example, in reducing power consumption.

In some embodiments, the memory controller indicates to the host that one or more of the policy rules are configurable, and possibly to what extent. The host may use this information to modify the memory controller's policy and thus improve performance.

The methods and systems described herein are particularly advantageous when the host and the memory controller communicate using a high-speed protocol that supports multiple concurrent commands and out-of-order execution, such as SATA, SAS or NVM express.

System Description

FIG. 1 is a block diagram that schematically illustrates a Solid State Disk (SSD) 24, in accordance with an embodiment of the present invention. SSD 24 stores data on behalf of a host 28. Host 28 may comprise, for example, a host processor in an enterprise storage system comprising multiple SSDs 24, a host processor in computing device such as a notebook or laptop computer, or any other suitable host. Host 28 and SSD 24 communicate over a high-speed interface 32, for example a SATA, SAS or NVM express interface.

SSD 24 comprises a high-level controller 36, which stores data in one or more non-volatile memory units 40. In the present example, memory units 40 comprise NAND Flash devices or dies. Alternatively, however, any other suitable type of non-volatile memory units can be used. Host 28 typically sends memory access commands (e.g., read and write commands) to SSD 24 over interface 32, and the SSD executes the commands in memory units 40. Host 28 typically comprises an interface for communicating the memory access commands to the SSD and for receiving responses to the commands, and a processor for carrying out the various host functions.

In the embodiment of FIG. 1, the execution of the memory access commands is partitioned among multiple processors. In addition to high-level controller 36, SSD 24 comprises multiple low-level controllers 44, each low-level controller assigned to a group of one or more memory units 40. In some embodiments, each memory unit 40 comprises processing circuitry (not shown in the figure). Execution of memory access commands is partitioned among high-level controller 36, low-level controllers 44 and the processing circuitry in memory units 40. Typically, although not necessarily, logical-to-physical address translation is performed by the high-level controller and Error Correction Coding (ECC) is performed by the low-level controllers. Alternatively, however, and other suitable partitioning of the command execution can be used.

In the context of the present patent application and in the claims, the high-level controller, the low-level controllers and the processing circuitry in the memory units are referred to collectively as a memory controller that executes the memory access commands issued by host 28. In alternative embodiments, the memory controller may comprise any other suitable number and types of controllers, or even a single controller. The embodiments described herein refer mainly to an SSD, but the disclosed techniques can be used in any other suitable memory system that stores data on behalf of a host.

High-level controller 36 comprises a memory interface 48 for communicating with memory units 40 (in the present example via low-level controllers 44), and a processor 52 that carries out the various functions of the high-level controller. High-level controller 36 comprises a memory 56. In particular, memory 56 holds a definition of a policy that the memory controller applies in storing data in memory units 40. The policy comprises a set of rules, for example one or more parallelization rules, pipeline rules and/or prioritization rules. As will be explained in detail below, the memory controller reports the policy to host 28, and the host uses the reported policy in formatting the memory access commands sent to the SSD.

Some or all of the functions of the memory controller may be implemented in hardware. Alternatively, the memory controller may comprise one or more microprocessors that run suitable software, or a combination of hardware and software elements. In some embodiments, the memory controller comprises one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The configuration of FIG. 1 is an exemplary configuration, which is shown purely for the sake of conceptual clarity. Any other suitable memory system configuration can also be used. Elements that are not necessary for understanding the principles of the present invention have been omitted from the figure for clarity. In the example configuration shown in FIG. 1, memory units 40, low-level controllers 44 and high-level controller 36 are implemented as separate Integrated Circuits (ICs). In alternative embodiments, however, any subset of these elements may be integrated on separate semiconductor dies in a single Multi-Chip Package (MCP) or System on Chip (SoC), and may be interconnected by an internal bus. Further alternatively, some or all of the SSD circuitry may reside on the same die on which one or more of the memory units are disposed. Further alternatively, some or all of the functionality of the memory controller can be implemented in software and carried out by host 28. In some embodiments, host 28 and the memory controller may be fabricated on the same die, or on separate dies in the same device package.

Exporting Storage Policy Rules to the Host

In some embodiments, the memory controller executes the memory access commands received from host 28 in accordance with a predefined policy. For example, the protocol used over high-speed interface 32 may permit out-of-order execution of a limited number of pending commands. This sort of protocol allows the memory controller freedom in prioritizing and parallelizing the execution of the memory access commands, in order to optimize performance measures such as latency and throughput.

The policy comprises a set of rules, for example parallelization rules, pipeline rules, prioritization rules, redundancy rules, power consumption rules and/or memory unit characteristics rules. Parallelism rules define how the memory controller distributes the memory access commands among the memory units. Pipeline rules define properties of a pipeline in the memory controller (not shown in the figure) that executes the commands. Prioritization rules define how the memory controller prioritizes execution of various types of commands.

Redundancy rules define whether the memory controller applies a redundant storage scheme (e.g., RAID-like scheme) among the memory units, and parameters of the scheme such as parity calculation rules. Power consumption rules define power consumption characteristics of the memory system, such as the power consumed by various memory access commands and/or maximum permitted power consumption of the system as a whole. Memory unit performance rules define actual performance characteristics of individual memory units, such as speed or available redundancy, which may differ from unit to unit due to manufacturing tolerances. Additionally or alternatively, the policy may comprise any other suitable type of rules.

In some embodiments, the memory controller reports one or more of the rules of the policy to host 28. The host formats the memory access commands using its awareness of the reported rules. Typically, the host formats the memory access commands in accordance with a criterion that optimizes a performance measure of the storage process, for example throughput, latency or power consumption. The host may format the memory access commands based on the policy in any suitable way and in accordance with any suitable criterion. Several examples are given below.

For example, in some embodiments the host sends each memory access command along with a logical address to which the command is to be applied. In an example embodiment, data is accessed by the host in block units, e.g., 512-byte block, and each block is assigned by the host a respective Logical Block Address (LBA). According to the policy, the memory controller translates the logical addresses to respective physical storage locations in memory units 40, and executes the commands in the memory units according to the logical-to-physical address mapping.

In some embodiments, a parallelism rule may define ranges of LBAs that are mapped to respective memory units, and/or ranges of LBAs that are mapped to respective low-level controllers. The mapping of logical addresses to memory units or low-level controllers may be expressed as a function of the logical addresses. For example, a certain subset of bits in the logical address may indicate the memory unit or low-level controller in which this address is assigned. More generally, a parallelism rule may define ranges of LBAs that can be accessed in parallel by the memory controller. The memory controller reports this rule to host 28.

Being aware of the parallelism rule, the host is able to assign LBAs to memory access commands in a way that increases the parallelism among memory units 40 and/or low-level controllers 44. Additionally or alternatively, the host may set the order in which the commands are issued to the memory controller in a way that increases the parallelism. For example, LBA assignment or ordering of this sort may avoid temporary congestion in a certain memory unit or low-level controller, and thus reduce latency.

Another aspect of parallelization has to do with relative latencies of memory units 40. In some embodiments, memory units 40 may differ from one another in read and/or write latency. An example rule may indicate these differences in latency. When the memory controller reports this rule to the host, the host is able to format the memory access commands accordingly. For example, the host may increase the number of memory access commands issued to fast memory units and/or decrease the number of commands issued to slow memory units, so as to reduce the average latency.

In some embodiments, the policy defines that the memory controller executes the memory access commands in a pipelined manner. In a pipelined execution the memory controller breaks the commands into parts for execution by different pipeline stages, and executes one part of one command concurrently with execution of another part of another command. The different pipeline stages may be executed by different controllers in the memory controller.

For example, a read command typically involves fetching ECC-encoded data from memory units 40, decoding the ECC and sending the decoded data to the host. In an embodiment, each read command is broken into three pipeline stages—fetching the data (e.g., by the processing circuitry in the memory units), decoding the ECC (e.g., by the low-level controllers) and sending the data to the host (e.g., by the high-level controller). In an example pipelined execution, the processing circuitry in the memory units may fetch the data of a certain read command, while the low-level controllers decode the ECC of a previous read command, and while the high-level controller send the decoded data of a still earlier read command. Any other suitable pipeline configuration can be used in alternative embodiments.

In some embodiments, a pipeline rule defines one or more properties of the execution pipeline, and the memory controller reports these properties to the host. The host uses the reported pipeline properties to format the memory access commands so as to improve performance. For example, if the memory controller reports the pipeline depth (the number of pipeline stages) to the host, the host may limit the number of pending memory access commands so as not to exceed the pipeline depth. This technique reduces latency and also reduces internal buffering requirements of pending commands in the memory controller.

In some embodiments, the policy defines that the memory controller assigns respective priorities to the memory access commands, and executes the commands (possibly out-of-order) in accordance with the priorities. For example, a prioritization rule may define that read commands have priority over write commands, or that short-latency commands have priority over long-latency commands. In an embodiment, the memory controller reports the prioritization rule to the host, and the host uses the reported rule to format the memory access commands so as to improve performance.

In some embodiments, the policy defines a redundant storage scheme (e.g., a RAID-like scheme) that the memory controller applies among the memory units while storing the data. In these embodiments, redundancy rules may specify whether such a scheme is applied or not, as well as various parameters of the redundant storage scheme. Such parameters may comprise, for example, the formulas or rules used by the memory controller in calculating parity information over the data. Being aware of the redundancy rules, the host may format memory access commands in a way that enhances redundancy and/or improves other performance parameters.

In other embodiments, the policy defines power consumption rules, which indicate to the host power consumption characteristics of the memory units or the memory system as a whole. The power consumption rules may specify, for example, the peak and/or average power consumption of various memory access commands. Additionally or alternatively, the power consumption rules may specify to total peak and/or average power that is permitted by the memory system as a whole. Being aware of these rules, the host may format the memory access commands in a manner that improves performance—e.g., reduces power consumption or avoids exceeding the total permitted power.

In some embodiments, the policy defines memory unit performance rules, which specify performance characteristics of individual memory units that may differ from unit to unit. Such performance characteristics may comprise, for example, speed and/or available redundancy. Being aware of these rules, the host may format memory access commands in a manner that improves storage performance such as latency or throughput.

The memory controller may report the policy to the host in various ways. In some embodiments, the rules of the policy may be predefined as part of the SSD specifications, and the host may be pre-configured with the policy. Additionally or alternatively, the memory controller may report the rules of the policy over interface 32, e.g., using extensions to the storage protocol used between the memory controller and the host.

Further additionally or alternatively, the memory controller may report the rules of the policy using sideband signaling, either over interface 32 or using any other suitable interface. In some embodiments, one or more of the rules changes over time, during operation of the SSD, and the memory controller notifies the host of the change, e.g., over interface 32.

Figure 2:
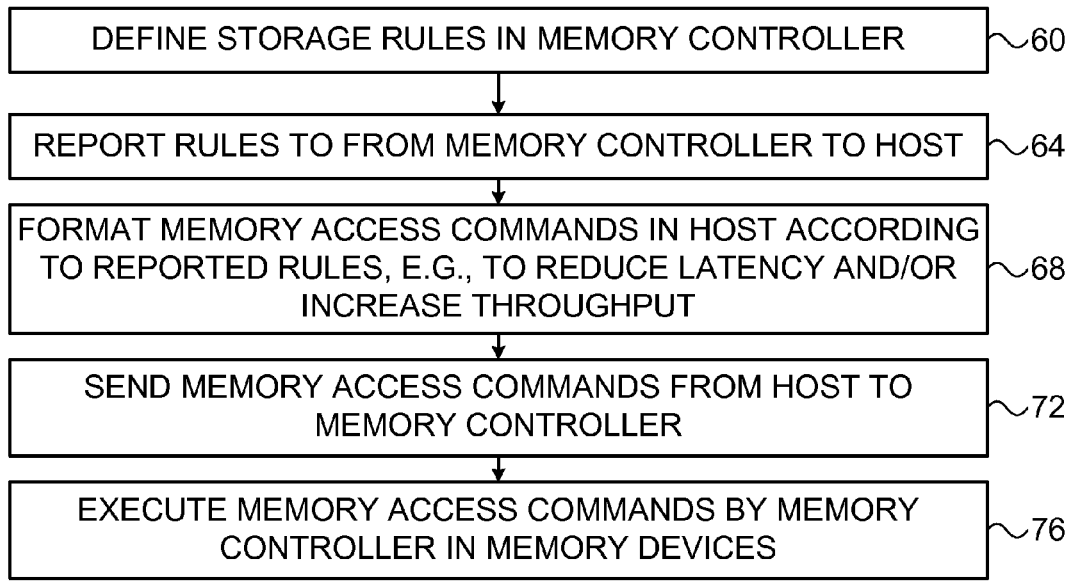
FIG. 2 is a flow chart that schematically illustrates a method for data storage, in accordance with an embodiment of the present invention.

FIG. 2 is a flow chart that schematically illustrates a method for data storage, in accordance with an embodiment of the present invention. The method begins with the memory controller in SSD 24 defining (or holding a definition of) one or more storage policy rules, at a rule definition step 60. The memory controller reports one or more of the rules to host 28, at a reporting step 64.

The host formats the memory access commands according to the reported rules, at a formatting step 68, in order to improve performance such as latency, throughput or power consumption. The host sends the formatted memory access commands to the memory controller, at a sending step 72. The memory controller receives the memory access commands and executes the commands in memory units 40, at an execution step 76.

In some embodiments, one or more of the rules in the memory controller policy may be configurable. The memory controller reports to the host which rules are configurable, and possibly to what extent. Based on this information, the host may issue to the memory controller a command that configures or modifies the memory controller, so as to improve performance. For example, the mapping of LBAs or LBA ranges to physical memory units may be configurable in the memory controller. In this example, the memory controller may report this configurability to the host, and the host may configure the memory controller to modify the mapping as desired.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A data storage method, comprising:
in a memory controller that accepts memory access commands from a host via a first interface for execution in one or more memory units, holding a definition of a policy to be applied by the memory controller in the execution of the memory access commands in the one or more memory units, wherein the policy includes one or more rules;
reporting the policy from the memory controller to the host using sideband signaling on a second interface so as to cause the host to format memory access commands based on the reported policy; and
sending, to the host, information indicative of which rules in the policy in the memory controller are configurable, wherein the information includes an extent to which a given rule can be modified.

2. The method according to claim 1, wherein reporting the policy comprises reporting one or more parallelism rules that specify distribution of the memory access commands among the one or more memory units.

3. The method according to claim 1, wherein reporting the policy comprises reporting one or more parallelism rules that specify ranges of logical addresses that are accessed in parallel by the memory controller.

4. The method according to claim 1, wherein reporting the policy comprises reporting one or more pipeline rules that specify properties of an execution pipeline in the memory controller, which executes the memory access commands in the one or more memory units.

5. The method according to claim 1, wherein reporting the policy comprises reporting one or more prioritization rules that specify priorities according to which the memory controller executes the memory access commands in the one or more memory units.

6. The method according to claim 1, wherein reporting the policy comprises reporting one or more redundancy rules that specify a redundant storage scheme applied by the memory controller in the one or more memory units.

7. The method according to claim 1, wherein reporting the policy comprises reporting one or more power consumption rules that specify power consumption characteristics of the one or more memory units.

8. The method according to claim 1, wherein reporting the policy comprises reporting one or more performance rules that specify performance characteristics of individual units of the one or more memory units.

9. The method according to claim 1, wherein reporting the policy comprises reporting a mapping, defined in the memory controller, between logical addresses
associated with the memory access commands and respective physical storage locations in the one or more memory units.

10. The method according to claim 1, and comprising:
formatting the memory access commands in the host in accordance with a criterion that optimizes a performance measure of the execution responsively to the reported policy, and
sending the formatted memory access commands from the host to the memory controller; and
receiving the memory access commands in the memory controller and executing the received memory access commands in the one or more memory units.

11. The method according to claim 10, wherein the criterion maximizes a throughput of the execution.

12. The method according to claim 10, wherein the criterion minimizes a latency of the execution.

13. The method according to claim 10, wherein the criterion minimizes a power consumption of the execution.

14. The method according to claim 10, wherein reporting the policy comprises reporting a mapping, defined in the memory controller, between logical addresses
associated with the memory access commands and respective physical storage locations in the one or more memory units, and wherein formatting the memory access commands comprises assigning the logical addresses to the memory access commands responsively to the reported policy.

15. The method according to claim 10, wherein formatting the memory access commands comprises setting an order of the memory access commands responsively to the reported policy.

16. The method according to claim 10, wherein formatting the memory access commands comprises modifying the given rule in the memory controller by the host processor.

17. A data storage method, comprising:
holding in a memory controller a definition of a policy to be applied by the memory controller in accessing one or more memory units, wherein the policy includes one or more rules;
reporting the policy from the memory controller to a host that is coupled to the memory controller via sideband signaling on a first interface;
sending, to the host, information indicative of which rules in the policy in the memory controller are configurable, wherein the information includes an extent to which a given rule can be modified;
in response to reporting the policy, receiving on a second interface in the memory controller memory access commands that have been formatted by the host in accordance with a criterion that optimizes a performance measure of execution of the memory access commands responsively to the reported policy; and
executing the received memory access commands in the one or more memory units.

18. A data storage method, comprising:
receiving from a memory controller via sideband signaling on a first interface a communication to a host reporting a definition of a policy to be applied by the memory controller in accessing one or more memory units, wherein the policy includes one or more rules;
receiving from the memory controller, information indicative of which rules in the policy in the memory controller are configurable, wherein the information includes an extent to which a given rule can be modified;

formatting memory access commands in the host in accordance with a criterion that optimizes a performance measure of execution of the memory access commands responsively to the reported policy; and sending the formatted memory access commands from the host on a second interface to the memory controller for execution.

19. A memory controller, comprising:

a memory, which is configured to hold a definition of a policy to be applied by the memory controller in accessing one or more memory units, wherein the policy includes one or more rules; and a processor, which is configured to report the policy using sideband signaling on a first interface to a host that is coupled to the memory controller, to send, to the host, information indicative of which rules in the policy in the memory controller are configurable, wherein the information includes an extent to which a given rule can be modified, and, in response to reporting the policy, to receive memory access commands via a second interface that have been formatted by the host in accordance with a criterion that optimizes a performance measure of execution of the memory access commands responsively to the reported policy, and to execute the received memory access commands in the one or more memory units.

20. The memory controller according to claim 19, wherein the processor is configured to report to the host one or more parallelism rules that specify distribution of the memory access commands among the one or more memory units.

21. The memory controller according to claim 19, wherein the processor is configured to report to the host one or more parallelism rules that specify ranges of logical addresses that are accessed in parallel by the processor.

22. The memory controller according to claim 19, wherein the processor is configured to report to the host one or more pipeline rules that specify properties of an execution pipeline in the processor, which executes the memory access commands in the one or more memory units.

23. The memory controller according to claim 19, wherein the processor is configured to report to the host one or more prioritization rules that specify priorities according to which the processor executes the memory access commands in the one or more memory units.

24. The memory controller according to claim 19, wherein the processor is configured to report to the host one or more redundancy rules that specify a redundant storage scheme applied by the processor in the one or more memory units.

25. The memory controller according to claim 19, wherein the processor is configured to report to the host one or more power consumption rules that specify power consumption characteristics of the one or more memory units.

26. The memory controller according to claim 19, wherein the processor is configured to report to the host one or more performance rules that specify performance characteristics of individual units of the one or more memory units.

27. The memory controller according to claim 19, wherein the processor is configured to report to the host a mapping, defined in the processor, between logical addresses associated with the memory access commands and respective physical storage locations in the one or more memory units.

28. The memory controller according to claim 19, wherein the processor is further configured to receive from the host, a command to modify the given rule in the policy.

29. A system, comprising:

a memory controller, which is configured to accept memory access commands for execution in one or more memory units, to hold a definition of a policy to be applied in the execution of the memory access commands in the one or more memory units, to report the policy via a first interface, wherein the policy includes one or more rules, and to send, to the host, information indicative of which rules in the policy in the memory controller are configurable, wherein the information includes an extent to which a given rule can be modified; and a host, which is configured to accept the reported policy from the memory controller over the first interface via sideband signaling, to format the memory access commands in accordance with a criterion that optimizes a performance measure of the execution of the memory access commands responsively to the reported policy, and to send the formatted memory access commands to the memory controller via a second interface for the execution in the one or more memory units.

30. The system according to claim 29, wherein the criterion maximizes a throughput of the execution.

31. The system according to claim 29, wherein the criterion minimizes a latency of the execution.

32. The system according to claim 29, wherein the criterion minimizes a power consumption of the execution.

33. The system according to claim 29, wherein the memory controller is configured to report to the host a mapping, defined in the memory controller, between logical addresses associated with the memory access commands and respective physical storage locations in the one or more memory units, and wherein the host is configured to assign the logical addresses to the memory access commands responsively to the reported policy.

34. The system according to claim 29, wherein the host is configured to set an order of the memory access commands responsively to the reported policy.

35. The system according to claim 29, wherein the host is configured to modify the given rule in the memory controller.

* * * * *